US011037251B2

(12) United States Patent
Baran et al.

(10) Patent No.: US 11,037,251 B2
(45) Date of Patent: Jun. 15, 2021

(54) UNDERSTANDING BUSINESS INSIGHTS AND DEEP-DIVE USING ARTIFICIAL INTELLIGENCE

(71) Applicant: Microsoft Technology Licensing, LLC, Redmond, WA (US)

(72) Inventors: Burcu Baran, Mountain View, CA (US); Chi-Yi Kuan, Fremont, CA (US); Huan Van Hoang, San Jose, CA (US); Yue Li, Los Altos, CA (US); Yan Liu, Sunnyvale, CA (US); Vibhu Prakash Saxena, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 729 days.

(21) Appl. No.: 15/446,689

(22) Filed: Mar. 1, 2017

(65) Prior Publication Data

US 2018/0253658 A1    Sep. 6, 2018

(51) Int. Cl.
*G06Q 50/00* (2012.01)
*G06N 20/00* (2019.01)

(52) U.S. Cl.
CPC ............. *G06Q 50/01* (2013.01); *G06N 20/00* (2019.01)

(58) Field of Classification Search
CPC ...... G06N 99/00; G06N 99/005; G06N 20/00; G06Q 50/00; G06Q 50/01
See application file for complete search history.

(56) References Cited

U.S. PATENT DOCUMENTS

| 8,682,812 B1* | 3/2014 | Ranjan | H04L 63/1425 |
| | | | 706/12 |
| 9,439,081 B1* | 9/2016 | Knebl | H04W 16/18 |
| 2014/0156566 A1* | 6/2014 | Kabiljo | G06Q 50/01 |
| | | | 706/12 |
| 2016/0055010 A1* | 2/2016 | Baird | G06F 16/9535 |
| | | | 707/727 |

(Continued)

OTHER PUBLICATIONS

Tang, Jie, et al. "Arnetminer: extraction and mining of academic social networks." Proceedings of the 14th ACM SIGKDD international conference on Knowledge discovery and data mining. ACM, 2008, pp. 990-998 (Year: 2008).*

(Continued)

*Primary Examiner* — Kamran Afshar
*Assistant Examiner* — Randall K. Baldwin
(74) *Attorney, Agent, or Firm* — Hickman Becker Bingham Ledesma LLP (57) ABSTRACT

A system, a machine-readable storage medium storing instructions, and a computer-implemented method are described herein are directed to a Key Feature Engine receives a request for a desired number of key features to be identified from a data set in at least a portion of a database. The Key Feature Engine executes instances of multiple types of machine learning data models on the data set to calculate respective regression coefficients, in each machine learning data model instance, for each feature in a plurality of features defined by a plurality of data categories of a social network service. The Key Feature Engine identifies at least one key feature, of one or more instances of the multiple types of machine learning data models, based on a value of a corresponding regression coefficient.

15 Claims, 7 Drawing Sheets

(56) References Cited

U.S. PATENT DOCUMENTS

| | | | | |
|---|---|---|---|---|
| 2016/0180266 A1* | 6/2016 | Palani | ............. | G06Q 10/06393 |
| | | | | 705/7.36 |
| 2017/0004455 A1* | 1/2017 | Tang | .................. | G06F 16/2246 |
| 2017/0061497 A1* | 3/2017 | Akkiraju | ............ | G06Q 30/0269 |
| 2017/0124487 A1* | 5/2017 | Szeto | ................ | G06Q 30/0204 |
| 2018/0197108 A1* | 7/2018 | Fang | ...................... | G06Q 30/02 |
| 2018/0218287 A1* | 8/2018 | Wang | ................ | G06Q 30/0201 |

OTHER PUBLICATIONS

Kuhn, Max. "Building predictive models in R using the caret package." Journal of statistical software 28.5 (2008): 1-26. (Year: 2008).*

Faul, Franz, et al. "Statistical power analyses using G*Power 3.1: Tests for correlation and regression analyses." Behavior research methods 41.4 (2009): 1149-1160. (Year: 2009).*

\* cited by examiner

UNDERSTANDING BUSINESS INSIGHTS AND DEEP-DIVE USING ARTIFICIAL INTELLIGENCE

TECHNICAL FIELD

The subject matter disclosed herein generally relates to the technical field of special-purpose machines that identify key features in an input data set including software-configured computerized variants of such special-purpose machines and improvements to such variants, and to the technologies by which such special-purpose machines become improved compared to other special-purpose machines that identify key features in an input data set.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

The present disclosure describes methods and systems for a Key Feature Engine of a professional social networking service (also referred to herein as a "professional social network," "social network" or a "social network service") that identifies one or more key features in an input data set. In the following description, for purposes of explanation, numerous specific details are set forth in order to provide a thorough understanding of the various aspects of different embodiments of the subject matter described herein. It will be evident, however, to one skilled in the art, that the subject matter described herein may be practiced without all of the specific details.

A system, a machine-readable storage medium storing instructions, and a computer-implemented method are described herein are directed to a Key Feature Engine receives a request for a desired number of key features to be identified from a data set in at least a portion of a database. The Key Feature Engine executes instances of multiple types of machine learning data models on the data set to calculate respective regression coefficients, in each machine learning data model instance, for each feature in a plurality of features defined by a plurality of data categories of a social network service. The Key Feature Engine identifies at least one key feature, of one or more instances of the multiple types of machine learning data models, based on a value of a corresponding regression coefficient. In one embodiment, it is understood that the Key Feature Engine executes only a single type of training model—as opposed to multiple types of training models.

According to various embodiments, The Key Feature Engine accesses business data (e.g. transaction data, revenue, purchase type, profile data of member accounts in transactions, data describing commercial entities) of the professional social network from which predefined features can be derived. For training data and training model purposes, a change in a key business metric in the business data is defined as the sole dependent variable. The total change in the key business metric for all member accounts in the business data is determined as being either positive or negative. If the total change is positive, the Key Feature Engine finds the key features that most influence the positive contribution and if the total change is negative, the Key Feature Engine finds the key features that most influence the negative contribution.

All the independent variables come from categorical data in the business data. Therefore, features of training models can be predefined based on the respective data categories in the business data. Input is received requesting that two key features be identified in a data set associated with one or more business metrics. In other words, the request is for output from the Key Feature Engine that describes what type of feature data is most relevant in affecting the change in one or more key business metrics. For example, the input requests that two key features be identified by the Key Feature Engine. A first instance of a training model, based on a first type of a linear regression algorithm, is executed with one feature for each of the predefined features. A second instance of the training model is executed with two features for each two combinations of the predefined features. A similar approach can be executed with training models based on different types of machine learning algorithms in conjunction with the training model based on the first type of linear regression algorithm.

The Key Feature Engine sorts all the model instances with respect to their R-square values. The features associated to the positive (or negative) coefficients of the model with the highest R-square values are therefore the key features which contribute to the positive (or negative) changes in the key business metrics.

It is understood that various embodiments described herein include encoded instructions that comprise operations to generate a user interface(s) and various user interface elements. The user interface and the various user interface elements can be displayed to be representative of any type of input, output, data, operation, pre-defined feature and calculation result described herein. In addition, the user interface and various user interface elements are generated by the Key. Feature Engine for display on a computing device, a server computing device, a mobile computing device, etc.

It is understood that, in some embodiments, a training model represented according to one more encoded instructions that, when executed, perform calculations that result in inferences, predictions, conclusions and estimations based in part on training data or an input data set for a given business metric. A training model type can be any of: a machine learning model, any type of linear regression model, a Random Forest model and a logistic regression model.

Figure 1:
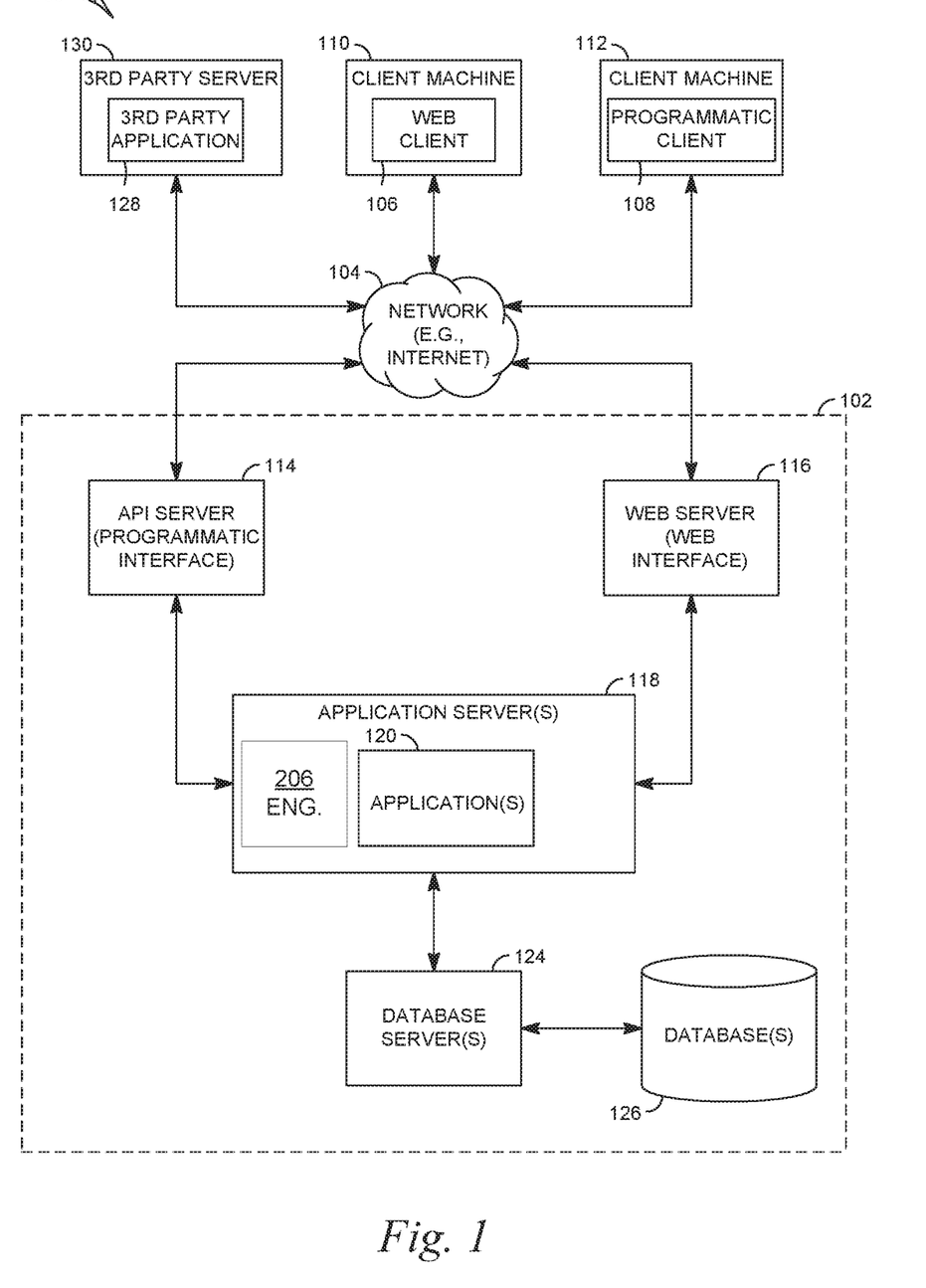
FIG. 1 is a block diagram illustrating a client-server system, in accordance with an example embodiment.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114. Also depicted is key feature engine 206 (abbreviated "Eng.") that will be described in more detail below FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
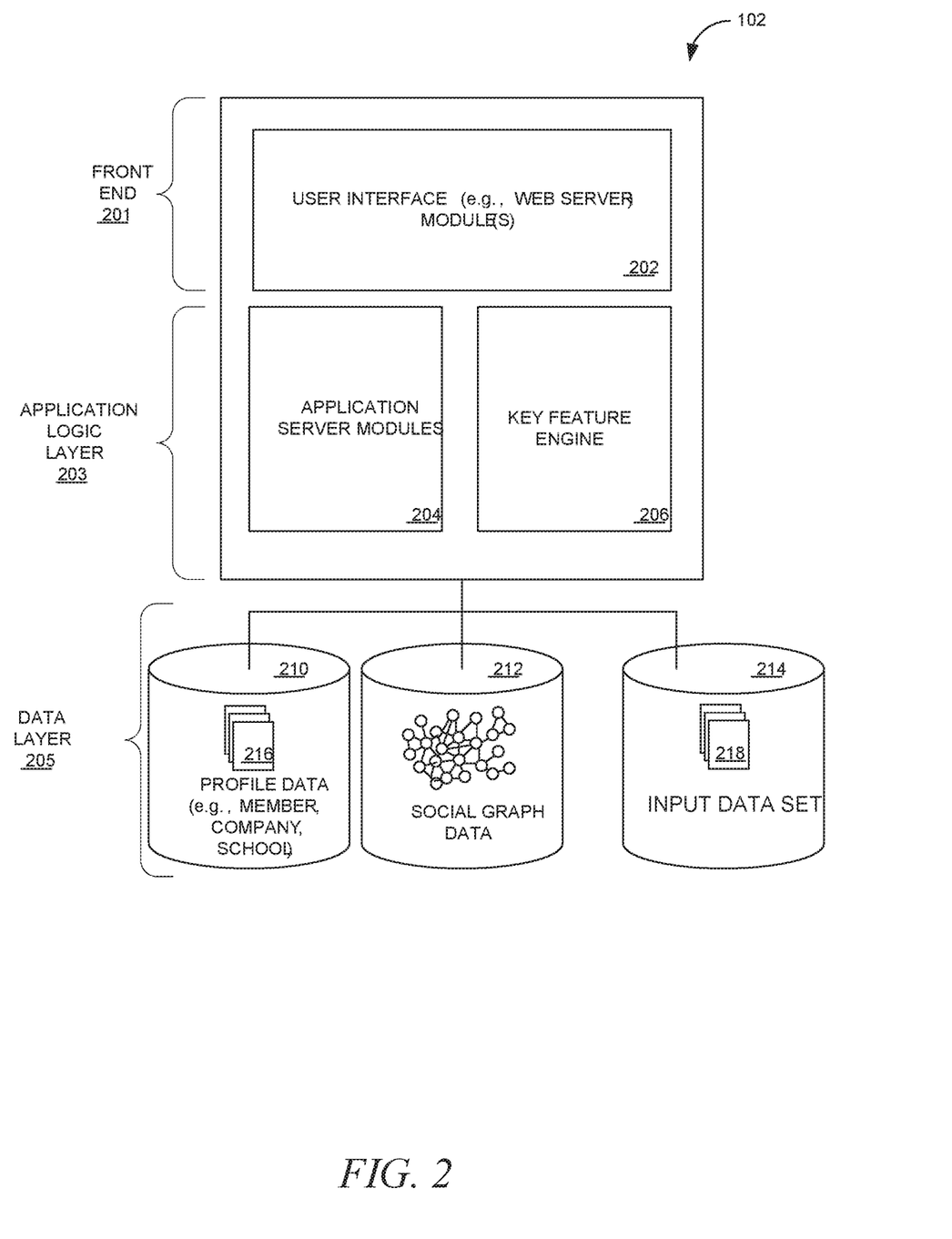
FIG. 2 is a block diagram showing functional components of a professional social network within a networked system, in accordance with an example embodiment.

FIG. 2 is a block diagram showing functional components of a professional social network within the networked system 102, in accordance with an example embodiment.

As shown in FIG. 2, the professional social network may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a professional social network, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile attribute data as well as profile attribute data for various organizations. Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the Key Feature Engine 206 as will be described in more detail below in conjunction with FIGS. 3-7. Although the Key Feature Engine 206 is referred to herein as being used in the context of a professional social network, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure. In one embodiment, the data layer 205 further includes a database 214 that includes data set 218 based on social network activity of one or more accounts of the social network service. Such social network activity can be, for example, data generated with respect to commercial transactions within the social network service. The commercial transactions are based on one or more predefined business data categories, such as a buyer type, purchase tier, purchase type and order type.

Figure 3:
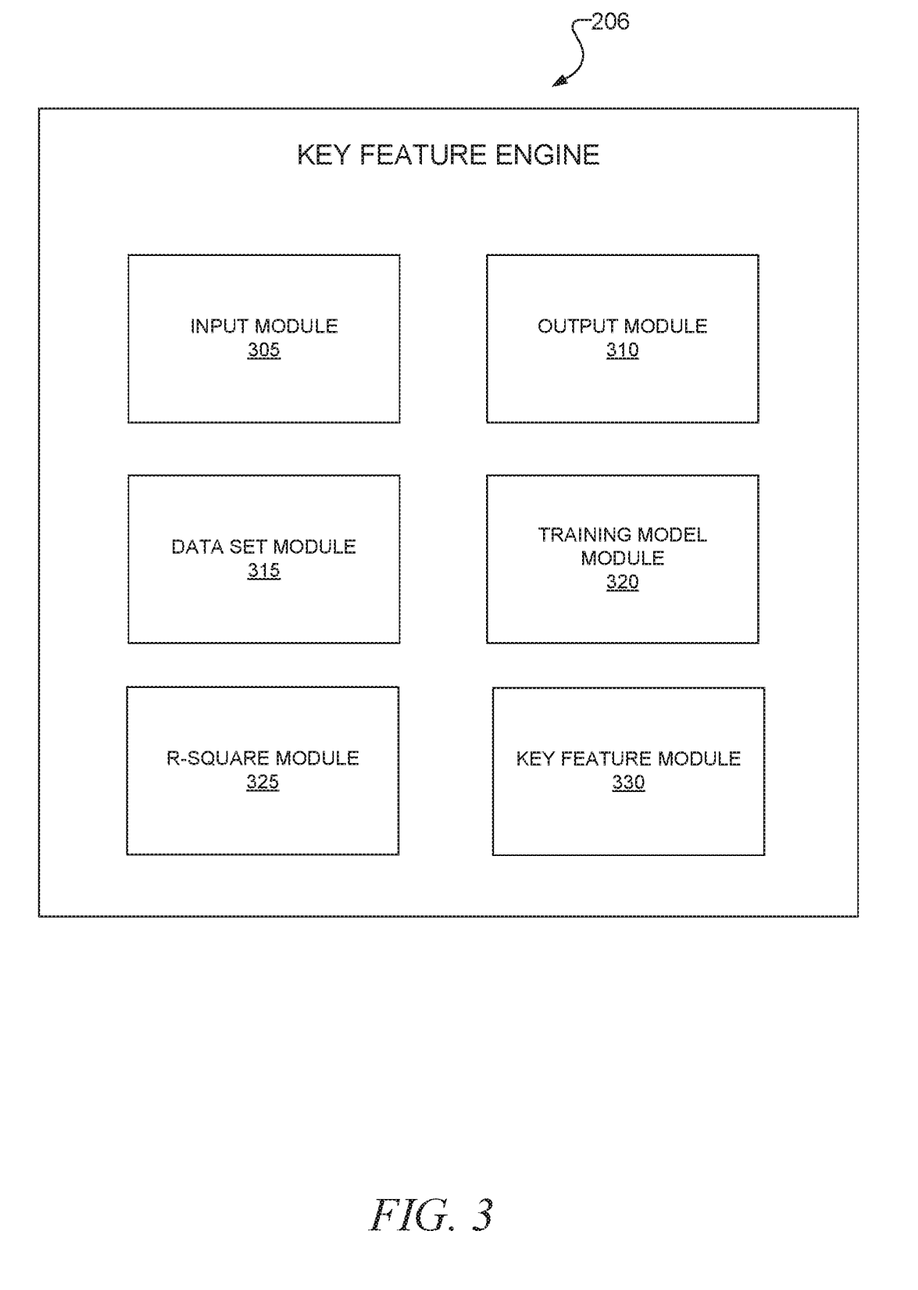
FIG. 3 is a block diagram showing example components of a Key Feature Engine, according to some embodiments.

FIG. 3 is a block diagram showing example components of a Key Feature Engine 206, according to some embodiments.

The input module 305 is a hardware-implemented module that controls, manages and stores information related to any inputs from one or more components of system 102 as illustrated in FIG. 1 and FIG. 2. In various embodiments, the inputs include a requested number of key features and a data set associated with a business metric.

The output module 310 is a hardware-implemented module that controls, manages and stores information related to which sends any outputs to one or more components of system 100 of FIG. 1 (e.g., one or more client devices 110, 112, third party server 130, etc.). In some embodiments, the output is one or more key features and corresponding data types of the one or more key features.

The data set module 315 is a hardware implemented module which manages, controls, stores, and accesses information related to collecting and organizing a data set associated with a business metric.

The training model module 320 is a hardware implemented module which manages, controls, stores, and accesses information related to instantiating and executing instances of various types of machine learning data models over the data set associated the business metric.

The R-square module 325 is a hardware implemented module which manages, controls, stores, and accesses information related to calculate an R-Square value one or more instances of machine learning data models.

The key feature module 330 is a hardware implemented module which manages, controls, stores, and accesses information related to identifying regression coefficients in select instances of machine learning data models.

Figure 4:
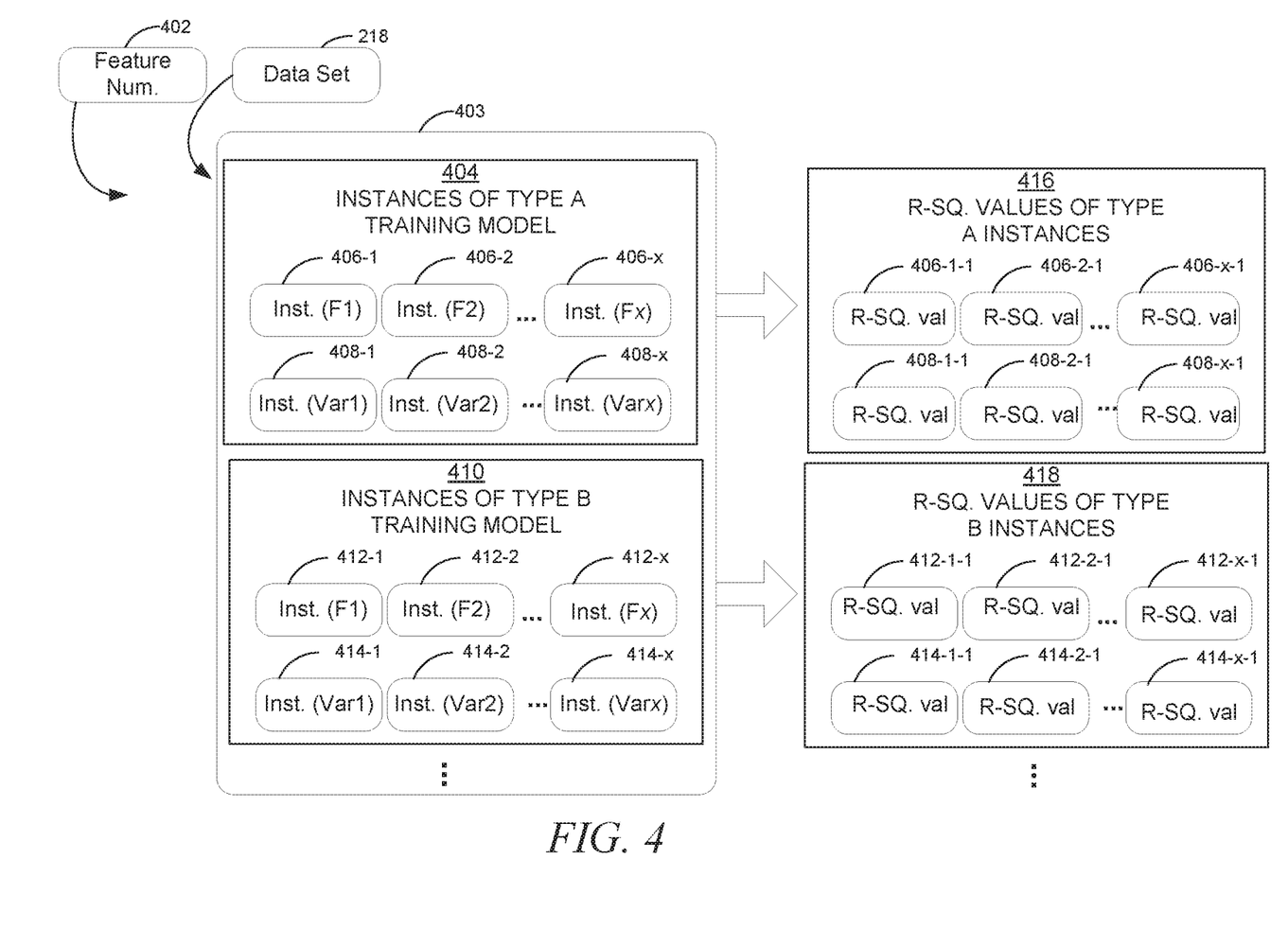
FIG. 4 is a block diagram showing a data flow in a Key Feature Engine, according to example embodiments.

FIG. 4 is a block diagram showing a data flow in a Key Feature Engine 206, according to an example embodiment. The data flow can be implemented by one or more of the modules illustrated in FIG. 3.

In one embodiment, the Key Feature Engine 206 identifies a desired (e.g. a user-defined) number of features that are to be determined as being most relevant in influencing a change of one or more business metrics over a period of time. Such a business metric can be, for example, a number of submitted job postings, a number of bookings received, a revenue change, a change in a number of social posts from a plurality of member accounts, orders received and initiated transactions (e.g. purchase transactions). The Key Feature Engine 206 receives, as input, a desired number 4002 of relevant features—however the type of data for the features have yet to be identified. The input further includes a data set 218 of the business metric over a period of time (e.g. one week, one month, one year). The output of the Key Feature Engine 206 is the data type(s) for the desired number 402 of features that contribute most to changes in the business metric. It is understood that, in some embodiments, a data type for a feature can be based on any type of data in profile data of member accounts of a professional social network service. As such, pre-defined features can be based on types of data (e.g. one or more data categories) that are already defined in the professional social network service.

The Key Feature Engine 206 executes multiple, different types of training models 404, 410 (such as different types of linear regression models) according to the input number 402 of desired features. For example, if the input number 402 of desired features is 10, then for a first type of training model A, a plurality of instances 406-1, 406-2, 406-*x* of model A is executed for one feature for each of the predefined features, a plurality of instances of the model A is executed for each variation of permutations of two predefined features. As illustrated, an instance 408-1 of model A is executed for a particular variation of a permutation of two features. It is understood that in some embodiments, the Key Feature Engine 206 executes only a single type of training model as opposed to multiple types of training models.

A plurality of instances of model A is executed for each variation of permutations of three predefined features. As illustrated, an instance 408-2 of model A is executed for a particular variation of a permutation of three features. A plurality of instance of the model A is executed for variation of permutations of four predefined features and so on up to a plurality of instances of model A executed for each variation of permutations of ten predefined features—because the requested input number of features is ten. As illustrated, an instance 408-*x* of model A is executed for a particular variation of a permutation of ten predefined features. Such an approach is executed for each type of different training model.

It follows, then, that for a second type of training model B, a plurality of instances 412-1, 412-2, 412-*x* of model B is executed for one feature for each of the predefined features, a plurality of instances of the model B is executed for each variation of permutations of two predefined features. As illustrated, an instance 414-1 of model B is executed for a particular variation of a permutation of two features.

A plurality of instances of model B is executed for each variation of permutations of three predefined features. As illustrated, an instance 414-2 of model A is executed for a particular variation of a permutation of three features. A plurality of instances of the model B is executed for each variation of permutations of four predefined features and so on up to a plurality of instances of model B executed for each variation of permutations of ten predefined features. As illustrated, an instance 414-*x* of model B is executed for a particular variation of a permutation of ten predefined features.

The Key Feature Engine 206 executes an R-square algorithm on each instance 406-1, 406-2 . . . 406-*x*, 408-1, 408-2 . . . 408-*x*, 412-1, 412-2 . . . 412-*x*, 414-1, 414-2 . . . 414-*x* of each type of training model. The R-square algorithm returns an R-square value 406-1-1, 406-2-1 . . . 406-*x*-1, 408-1-1, 408-2-1 . . . 408-*x*-1, 412-1-1, 412-2-1 . . . 412-*x*-1, 414-1-1, 414-2-1 . . . 414-*x*-1 between 0-1 for each training model instance.

Figure 5:
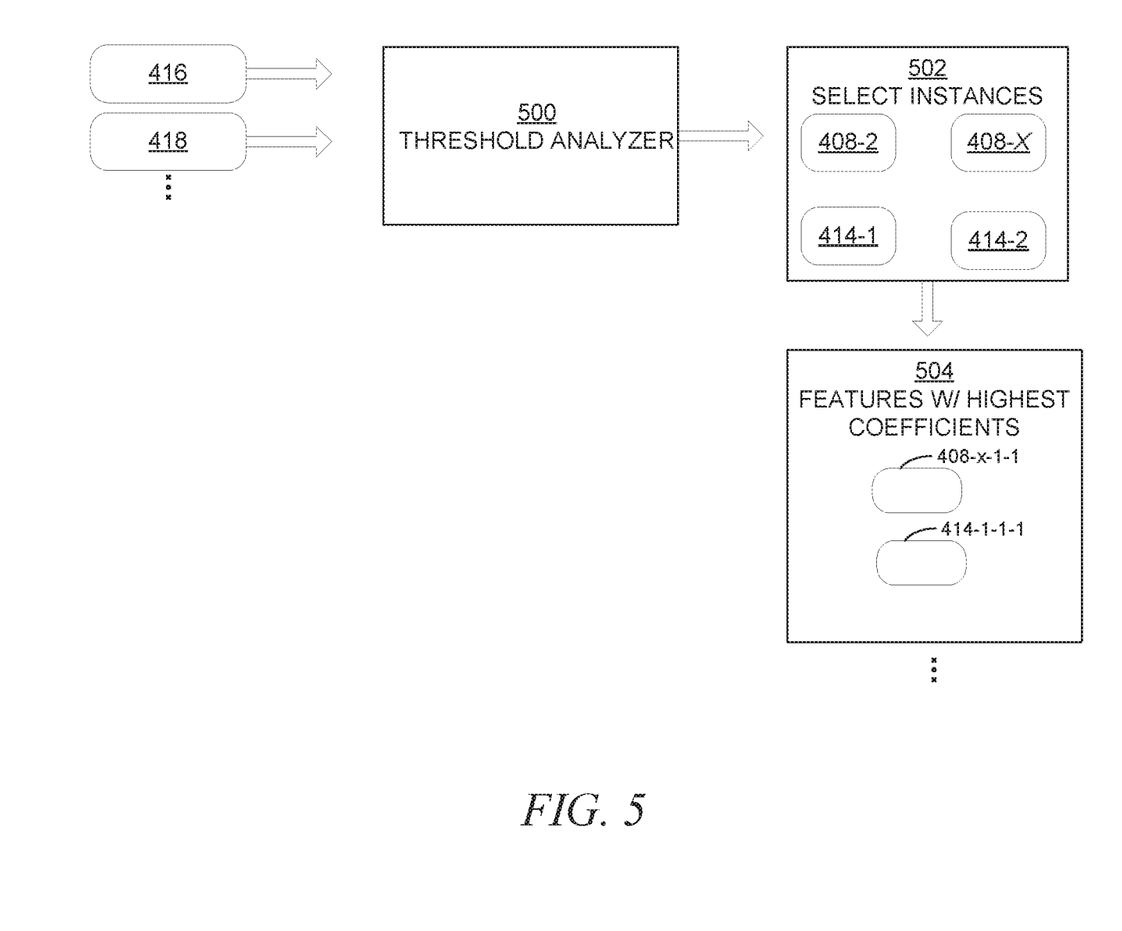
FIG. 5 is a block diagram showing a data flow in a Key Feature Engine, according to example embodiments.

FIG. 5 is a block diagram showing a data flow in a Key Feature Engine 206, according to example embodiments. The data flow can be implemented by one or more of the modules illustrated in FIG. 3.

The R-square values 416, 418 of all the training model instances is compared, by a threshold analyzer 500 of the Key Feature Engine 206, to a threshold value. Those training model instances having respective R-square values that meet or exceed the threshold value are selected by the Key Feature Engine 206 as select instances 502. Each select model instance 408-2, 408-*x*, 414-1, 414-2 thereby provides regression coefficients for predefined features of various data types (e.g. a predefined feature of a member account country, a predefined feature of type of purchase, etc.) in the input data set 218 of the business metric.

A predefined feature of a particular data type—in one of the respective select model instances 408-*x* (i.e. a model instance having an R-square value that satisfies the threshold value)—having the largest regression coefficient value is thereby determined as being a first key feature 408-*x*-1-1 that is most relevant in influencing the change in the key business metric over the period of time. To that end, for example, since ten desired key features were requested, the Key Feature Engine 206 identifies the ten highest regression coefficients across all the select model instances 408-2, 408-*x*, 414-1, 414-2 and the data types of those features 504 that correspond with the ten highest regression coefficients (two of which are depicted here as 408-*x*-1-1 and 414-1-1-1. Those corresponding features 504 are identified by the Key Feature Engine 206 as key features. The Key Feature Engine 206 provides the key features and the data category types of the key features as output. The output thereby represents the data in the data set 218 that is most influential to a change in one or more business metrics.

Figure 6:
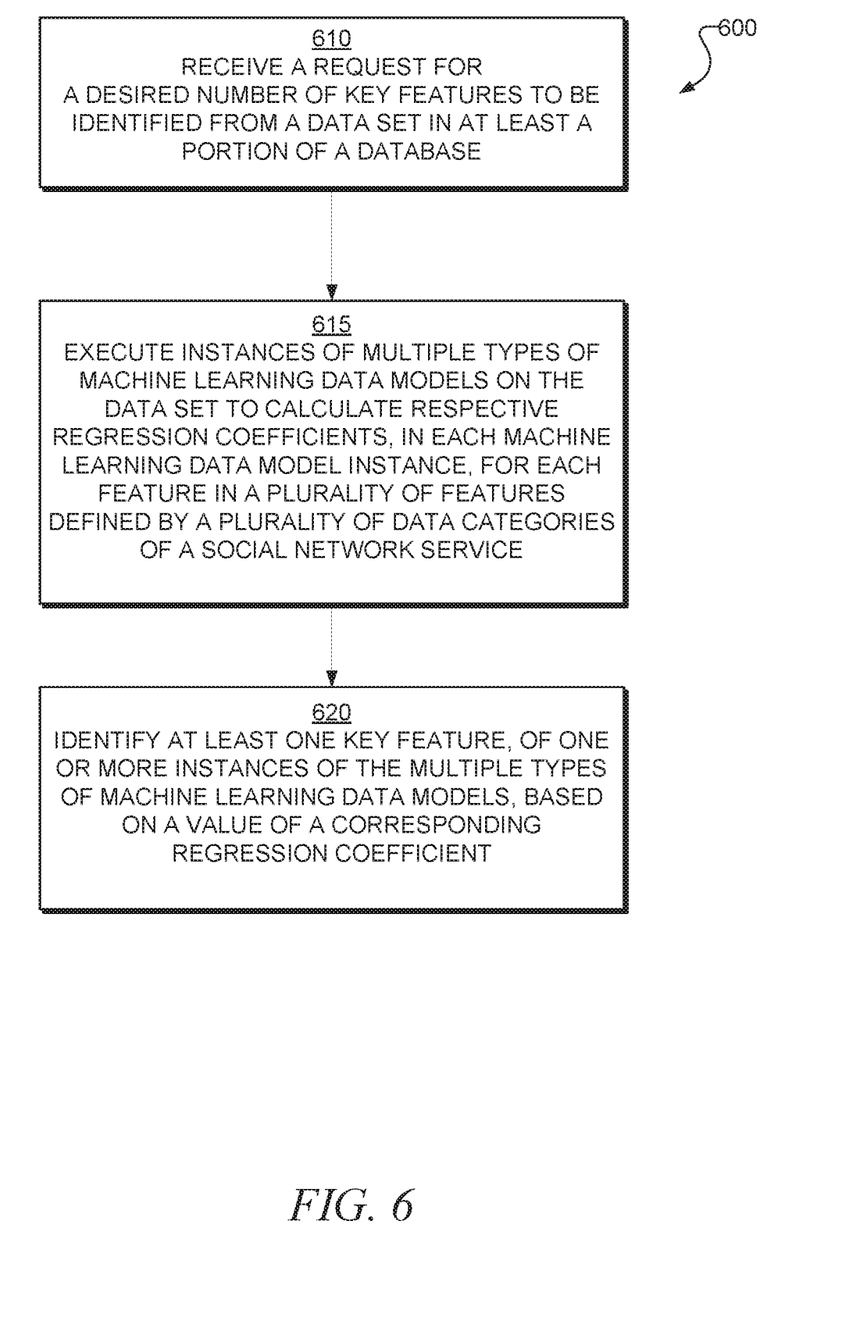
FIG. 6 is a flowchart illustrating an example method, according to various embodiments.

FIG. 6 is a flowchart 600 illustrating an example method, according to various embodiments. The method may be implemented by one or more of the modules illustrated in FIG. 3.

At operation 610, the Key Feature Engine 206 receives a request for a desired number of key features to be identified from a data set in at least a portion of a database.

At operation 615, the Key Feature Engine 206 executes instances of multiple types of machine learning data models on the data set to calculate respective regression coefficients, in each machine learning data model instance, for each feature in a plurality of features defined by a plurality of data categories of a social network service.

The Key Feature Engine 206 instantiates multiple instances of a first type of machine learning data model. The number of instances of the first type of machine learning data model based on the desired number of key features. In addition, the Key Feature Engine 206 instantiates multiple instances of a second type of machine learning data model. The number of instances of the second type of machine learning data model is also based on the desired number of key features.

For each feature from the plurality of features from predefined data categories, the Key Feature Engine 206 executes respective instances of the first type of machine learning data model to calculate corresponding regression coefficients. For each variation of a first permutation number of features from the plurality of features, the Key Feature Engine 206 executes respective instances of the first type of machine learning data model to calculate corresponding regression coefficients. The first permutation number of features is less than the desired number of key features. For each variation of a second permutation number of features from the plurality of features, the Key Feature Engine 206 executes respective instances of the first type of machine learning data model to calculate corresponding regression coefficients. The second permutation number of features is equal to the desired number of key features For each feature from the plurality of features, the Key Feature Engine 206 executes respective instances of the second type of machine learning data model to calculate corresponding regression coefficients. For each variation of the first permutation number of features, the Key Feature Engine 206 executes respective instances of the second type of machine learning data model to calculate corresponding regression coefficients. For each variation of the second permutation number of features, the Key Feature Engine 206 executes respective instances of the second type of machine learning data model to calculate corresponding regression coefficients.

At operation 620, the Key Feature Engine 206 identifies at least one key feature, of one or more instances of the multiple types of machine learning data models, based on a value of a corresponding regression coefficient.

The Key Feature Engine 206 calculates an R-Square value for all instances of all types of machine learning data models. The Key Feature Engine 206 compares each respective R-Square value to a threshold value. The Key Feature Engine 206 identifies at least one select machine learning data model instance from all instances of all types of machine learning data models, each select machine learning data model corresponding to a respective R-Square value that meets or exceeds the threshold value.

The Key Feature Engine 206 identifies a largest regression coefficient across all select instances. The Key Feature Engine 206 identifies a first feature to which the largest regression coefficient is assigned. The Key Feature Engine 206 identifies a next-largest regression coefficient across all select instances. The Key Feature Engine 206 identifies a second feature to which the next-largest regression coefficient is assigned. The Key Feature Engine 206 generates output representing the first and the second features as respective key features.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ARC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
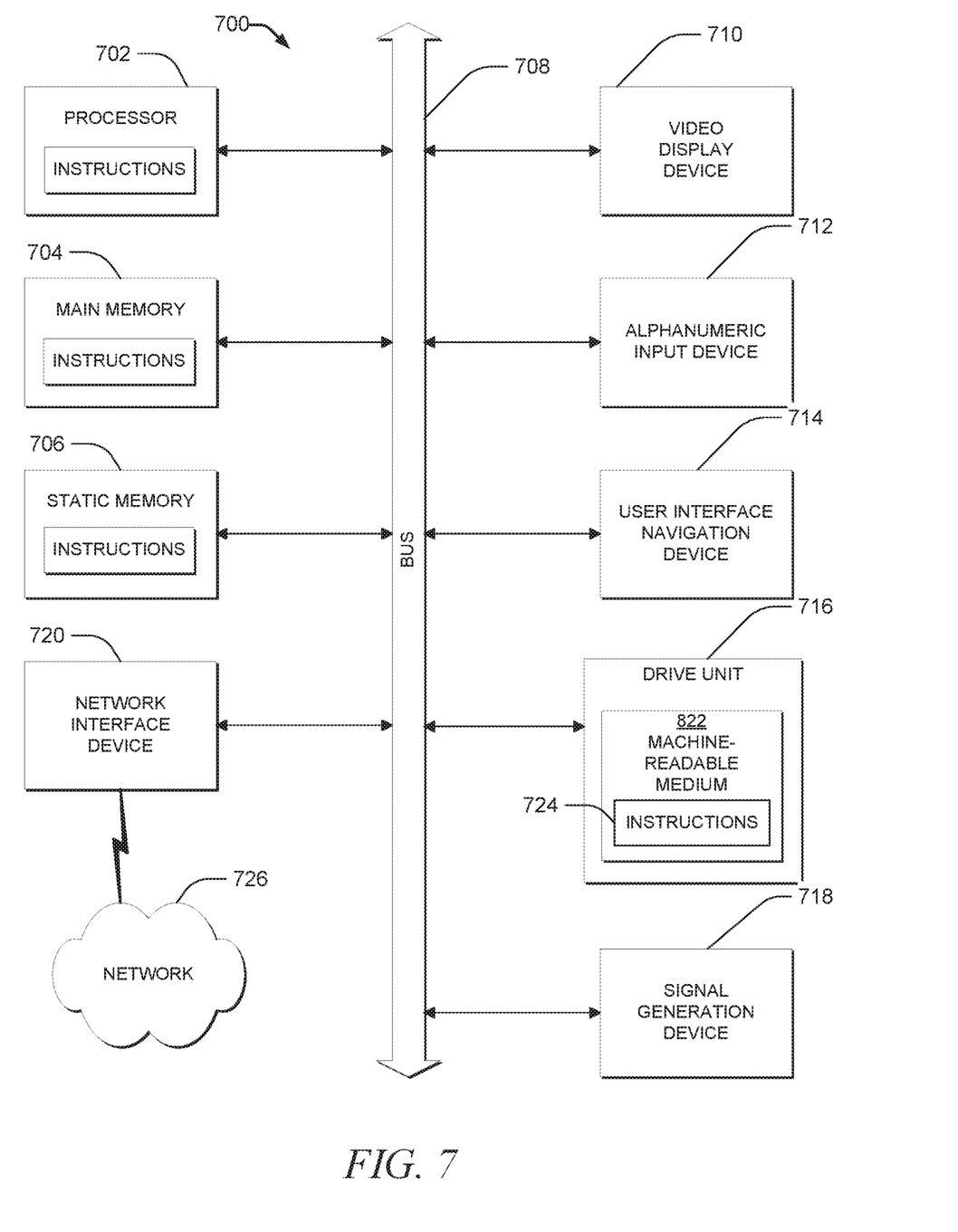
FIG. 7 is a block diagram of an example computer system on which operations, actions and methodologies described herein may be executed, in accordance with an example embodiment.

FIG. 7 is a block diagram of an example computer system 700 on which operations, actions and methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704, and a static memory 706, which communicate with each other via a bus 708. Computer system 700 may further include a video display device 710 (e.g., a liquid crystal display (LCD) or a cathode ray tube (CRT)). Computer system 700 also includes an alphanumeric input device 712 (e.g., a keyboard), a user interface (UI) navigation device 714 (e.g., a mouse or touch sensitive display), a disk drive unit 716, a signal generation device 718 (e.g., a speaker) and a network interface device 720.

Disk drive unit 716 includes a machine-readable medium 722 on which is stored one or more sets of instructions and data structures (e.g., software) 724 embodying or utilized by any one or more of the methodologies or functions described herein. Instructions 724 may also reside, completely or at least partially, within main memory 704, within static memory 706, and/or within processor 702 during execution thereof by computer system 700, main memory 704 and processor 702 also constituting machine-readable media.

While machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 724 may further be transmitted or received over a communications network 726 using a transmission medium. Instructions 724 may be transmitted using network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system, comprising:
   a processor;
   a memory device holding an instruction set executable on the processor to cause the computer system to perform operations comprising:
   receiving a request for a desired number, greater than one, of key features to be identified from a data set in at least a portion of a database;
   instantiating a number of instances, equal to the desired number of key features, of a first type of machine learning data model, each instance of the first type of machine learning data model trained to calculate different respective regression coefficients based on a first type of machine learning algorithm;
   instantiating the number of instances, equal to the desired number of key features, of a second type of machine learning data model, each instance of the second type of machine learning data model trained to calculate different respective regression coefficients based on a second type of machine learning algorithm, the second type of machine learning algorithm different than the first type of machine learning algorithm;
   executing the instances of the first type of machine learning data model and the instances of the second type of machine learning data model on the data set to calculate respective regression coefficients, in each machine learning data model instance, for each feature in a plurality of features defined by a plurality of data categories of a social network service;
   identifying at least one key feature based on a value of a corresponding calculated regression coefficient, wherein each key feature is a feature that is contained in the data set that is used as input to train one or more instances of the first type of machine learning data model and that positively or negatively impacts output of the one or more instances of the first type of machine learning data model more than other features in the data set;
   identifying a largest regression coefficient across all instances of the first and second types of machine learning data models;
   identifying a first feature to which the largest regression coefficient is assigned;
   identifying a next-largest regression coefficient across all instances of the first and second types of machine learning data models;
   identifying a second feature to which the next-largest regression coefficient is assigned; and
   generating output representing the first and the second features as respective key features.

2. A computer system as in claim 1, further comprising:
   for each feature from the plurality of features, execute a respective instance of the first type of machine learning data model to calculate corresponding regression coefficients;
   for each variation of a first permutation of a first number of features from the plurality of features, execute a respective instance of the first type of machine learning data model to calculate corresponding regression coefficients, the first number of features less than the desired number of key features; and
   for each variation of a second permutation of a second number of features from the plurality of features, execute a respective instance of the first type of machine learning data model to calculate corresponding regression coefficients, the second number of features equal to the desired number of key features.

3. A computer system as in claim 2, further comprising:
   for each feature from the plurality of features, execute a respective instance of the second type of machine learning data model to calculate corresponding regression coefficients;
   for each variation of the first number of features, execute a respective instance of the second type of machine learning data model to calculate corresponding regression coefficients; and for each variation of the second number of features, execute a respective instance of the second type of machine learning data model to calculate corresponding regression coefficients.

4. A computer system as in claim 1, wherein identifying the at least one key feature based on the value of the corresponding regression coefficient comprises:
calculating an R-Square value for all instances of the first and second types of machine learning data models;
comparing each respective R-Square value to a threshold value; and
identifying at least one select machine learning data model instance from all of the instances of the first and second types of machine learning data models, each select machine learning data model corresponding to a respective R-Square value that meets or exceeds the threshold value.

5. A computer system as in claim 1, wherein each respective data category of the social network service is a business data category or a profile data category.

6. A computer system as in claim 5, wherein the business data category comprises any of the following:
a buyer type, an order type, a type of job purchase, or a tier of job purchase.

7. A computer system as in claim 5, wherein the profile data category comprises any of the following:
a country identifier or a geographical region identifier.

8. A computer-implemented method comprising:
receiving a request for a desired number, greater than one, of key features to be identified from a data set in at least a portion of a database;
instantiating a number of instances, equal to the desired number of key features, of a first type of machine learning data model, each instance of the first type of machine learning data model trained to calculate different respective regression coefficients based on a first type of machine learning algorithm;
instantiating the number of instances, equal to the desired number of key features, of a second type of machine learning data model, each instance of the second type of machine learning data model trained to calculate different respective regression coefficients based on a second type of machine learning algorithm, the second type of machine learning algorithm different than the first type of machine learning algorithm;
executing the instances of the first type of machine learning data model and the instances of the second type of machine learning data model on the data set to calculate respective regression coefficients, in each machine learning data model instance, for each feature in a plurality of features defined by a plurality of data categories of a social network service;
identifying at least one key feature based on a value of a corresponding calculated regression coefficient, wherein each key feature is a feature that is contained in the data set that is used as input to train one or more instances of the first type of machine learning data model and that positively or negatively impacts output of one or more instances of the first type of machine learning data model more than other features in the data set;
identifying a largest regression coefficient across all instances of the first and second types of machine learning data models;
identifying a first feature to which the largest regression coefficient is assigned;
identifying a next-largest regression coefficient across all instances of the first and second types of machine learning data models;
identifying a second feature to which the next-largest regression coefficient is assigned; and
generating output representing the first and the second features as respective key features.

9. A computer-implemented method as in claim 8, further comprising:
for each feature from the plurality of features, execute a respective instance of the first type of machine learning data model to calculate corresponding regression coefficients;
for each variation of a first permutation of a first number of features from the plurality of features, execute a respective instance of the first type of machine learning data model to calculate corresponding regression coefficients, the first number of features less than the desired number of key features; and
for each variation of a second permutation of a second number of features from the plurality of features, execute a respective instance of the first type of machine learning data model to calculate corresponding regression coefficients, the second number of features equal to the desired number of key features.

10. A computer-implemented method as in claim 9, further comprising:
for each feature from the plurality of features, execute a respective instance of the second type of machine learning data model to calculate corresponding regression coefficients;
for each variation of the first number of features, execute a respective instance of the second type of machine learning data model to calculate corresponding regression coefficients; and
for each variation of the second number of features, execute a respective instance of the second type of machine learning data model to calculate corresponding regression coefficients.

11. A computer-implemented method as in claim 8, wherein identifying at least one key feature based on a value of a corresponding regression coefficient comprises:
calculating an R-Square value for all instances of all of the types of machine learning data models; and
identifying at least one select machine learning data model instance from all of the instances of all of the types of machine learning data models, each select machine learning data model corresponding to a respective R-Square value that meets or exceeds the threshold value.

12. A computer-implemented method as in claim 8, wherein each respective data category of the social network service is a business data category or a profile data category.

13. A computer-implemented method as in claim 12, wherein the business data category comprises any of the following:
a buyer type, an order type, a type of job purchase, or a tier of job purchase.

14. A computer system as in claim 12, wherein the profile data category comprises any of the following:
a country identifier and a geographical region identifier.

15. A non-transitory computer-readable medium storing executable instructions thereon, which, when executed by a processor, cause the processor to perform operations including:

receiving a request for a desired number, greater than one, of key features to be identified from a data set in at least a portion of a database;

instantiating a number of instances, equal to the desired number of key features, of a first type of machine learning data model, each instance of the first type of machine learning data model trained to calculate different respective regression coefficients based on a first type of machine learning algorithm;

instantiating the number of instances, equal to the desired number of key features, of a second type of machine learning data model, each instance of the second type of machine learning data model trained to calculate different respective regression coefficients based on a second type of machine learning algorithm, the second type of machine learning algorithm different than the first type of machine learning algorithm;

executing the instances of the first type of machine learning data model and the instances of the second type of machine learning data model on the data set to calculate respective regression coefficients, in each machine learning data model instance, for each feature in a plurality of features defined by a plurality of data categories of a social network service;

identifying at least one key feature based on a value of a corresponding calculated regression coefficient, wherein each key feature is a feature that is contained in the data set that is used as input to train one or more instances of the first type of machine learning data model and that positively or negatively impacts output of the one or more instances of the first type of machine learned model more than other features in the data set;

wherein identifying at least one key feature, of one or more instances of the multiple types of machine learning data models, based on a value of a corresponding regression coefficient comprises:

calculating an R-Square value for all of the instances of the first and second types of machine learning data models;

comparing each respective R-Square value to a threshold value;

identifying at least one select machine learning data model instance from all instances of all types of machine learning data models, each select machine learning data model corresponding to a respective R-Square value that meets or exceeds the threshold value;

identifying a largest regression coefficient across all select instances of all types of machine learning data models;

identifying a first feature to which the largest regression coefficient is assigned;

identifying a next-largest regression coefficient across all select instances of all types of machine learning data models;

identifying a second feature to which the next-largest regression coefficient is assigned; and generating output representing the first and the second features as respective key features.

* * * * *